United States Patent
Oraby et al.

(10) Patent No.: US 12,234,530 B2
(45) Date of Patent: Feb. 25, 2025

(54) PROCESS FOR ACIDIC LEACHING OF PRECIOUS AND CHALCOPHILE METALS

(71) Applicants: Mining and Process Solutions Pty Ltd, Caulfield North (AU); Covoro Mining Solutions, LLC, Memphis, TN (US)

(72) Inventors: Elsayed Abdelrady Oraby, Beckenham (AU); Jacobus Johannes Eksteen, Bull Creek (AU)

(73) Assignees: Mining and Process Solutions Pty Ltd, Melbourne (AU); Covoro Mining Solutions, LLC, Memphis, TN (US)

(*) Notice: Subject to any disclaimer, the term of this patent is extended or adjusted under 35 U.S.C. 154(b) by 275 days.

(21) Appl. No.: 16/651,106

(22) PCT Filed: Sep. 27, 2018

(86) PCT No.: PCT/AU2018/051060
§ 371 (c)(1),
(2) Date: Mar. 26, 2020

(87) PCT Pub. No.: WO2019/060961
PCT Pub. Date: Apr. 4, 2019

(65) Prior Publication Data
US 2020/0224290 A1    Jul. 16, 2020

(30) Foreign Application Priority Data
Sep. 27, 2017    (AU) .................... 2017903921

(51) Int. Cl.
C22B 3/16    (2006.01)
C22B 3/24    (2006.01)
(Continued)

(52) U.S. Cl.
CPC ............ *C22B 3/1658* (2013.01); *C22B 7/007* (2013.01); *C22B 3/24* (2013.01); *C22B 3/42* (2013.01); *C22B 3/46* (2013.01)

(58) Field of Classification Search
CPC ........... C22B 7/00; C22B 7/006; C22B 7/007; C22B 7/008; C22B 7/02; C22B 7/04;
(Continued)

(56) References Cited

U.S. PATENT DOCUMENTS 5,279,803 A * 1/1994 Clough .................... C22B 5/04
                                                    423/31
6,344,068 B1 * 2/2002 Fleming .................... C22B 3/42
                                                    423/561.1

(Continued)

FOREIGN PATENT DOCUMENTS

WO    2013023297    2/2013
WO    2015031943    3/2015
(Continued)

OTHER PUBLICATIONS

Gorse, Christopher Johnston, David Pritchard, Martin. Dictionary of Construction, Surveying and Civil Engineering. 2012. Oxford University Press, p. 114 (Year: 2012).*

(Continued)

*Primary Examiner* — George Wyszomierski
*Assistant Examiner* — Nikolas Takuya Pullen
(74) *Attorney, Agent, or Firm* — Michael Best & Friedrich LLP

(57) ABSTRACT

A process for recovery of one or more elements, selected from precious metals and chalcophile metals as herein defined, from materials containing precious and/or chalcophile metal/s, said process including: (i) a leaching step comprising contacting the material with an acidic solution containing a lixiviant comprising an aqueous amino acid- (Continued)

thiourea compound formed from an amino acid (as herein defined) and thiourea (as herein defined), in order to form a leachate containing the precious metal and/or chalcophile metal; and (ii) a recovery step comprising recovering the precious metal and/or chalcophile metal from the leachate.

27 Claims, 6 Drawing Sheets

(51) Int. Cl.
    *C22B 3/42* (2006.01)
    *C22B 3/46* (2006.01)
    *C22B 7/00* (2006.01)

(58) Field of Classification Search
    CPC ....... C22B 11/00; C22B 11/04; C22B 11/042; C22B 11/044; C22B 11/046; C22B 11/048; C22B 13/00; C22B 13/04; C22B 13/045; C22B 13/06; C22B 13/08; C22B 13/10; C22B 15/00; C22B 15/0008; C22B 15/0063; C22B 15/0065; C22B 15/0067; C22B 15/0073; C22B 15/0071; C22B 15/0078; C22B 15/0084; C22B 15/0086; C22B 15/0089; C22B 15/0091; C22B 17/00; C22B 17/04; C22B 17/06; C22B 19/00; C22B 19/02; C22B 19/20; C22B 19/22; C22B 19/24; C22B 19/26; C22B 19/28; C22B 19/30; C22B 19/32; C22B 25/00; C22B 25/04; C22B 25/06; C22B 25/08; C22B 30/00; C22B 30/02; C22B 30/04; C22B 30/06; C22B 41/00; C22B 43/00; C22B 58/00; C22B 61/00; C22B 23/00; C22B 23/04; C22B 23/0407; C22B 23/0415; C22B 23/0423; C22B 23/043; C22B 23/0438; C22B 23/0446; C22B 23/0453; C22B 23/0461; C22B 23/0469; C22B 23/0476; C22B 23/0484; C22B 23/0492; C22B 3/00; C22B 3/04; C22B 3/06; C22B 3/065; C22B 3/08; C22B 3/10; C22B 15/0002; C22B 15/0004; C22B 15/0069; C22B 15/0076; C22B 7/009; Y02P 10/20
    See application file for complete search history.

(56) References Cited

U.S. PATENT DOCUMENTS

2013/0281726 A1* 10/2013 Suso ............... C07C 323/60
                                                    562/556
2014/0212346 A1* 7/2014 Xia ................. C22B 11/04
                                                    423/1

FOREIGN PATENT DOCUMENTS

WO         2016141438      9/2016
WO    WO-2016141438 A1 *  9/2016   ............... C22B 3/12
WO         2016164600     10/2016

OTHER PUBLICATIONS

Pierre Lacoste-Bouchet, Guy Deschênes, Edward Ghali, Thiourea leaching of a copper-gold ore using statistical design, Jun. 15, 1998, Hydrometallurgy, vol. 47, Issues 2-3, (Year: 1998).*
European Patent Office Extended Search Report for Application No. 18862611.3 dated May 31, 2021 (5 pages).
Oraby et al., "The leaching of gold, silver and their alloys in alkaline glycine-peroxide solutions and their adsorption on carbon", Hydrometallurgy, 2015, vol. 152, pp. 199-203.
Chilean Patent Office Search Report for Application No. 202000763 dated May 20, 2021 (3 pages).
International Search Report for Application No. PCT/AU2018/051060 dated Nov. 27, 2018 (3 pages).
Chilean Patent Office Search Report for Application No. 202000763 dated Jan. 19, 2022 (3 pages).

* cited by examiner

PROCESS FOR ACIDIC LEACHING OF PRECIOUS AND CHALCOPHILE METALS

TECHNICAL FIELD

A process is disclosed for the recovery of one or more elements, selected from precious metals and chalcophile metals, from materials containing precious and/or chalcophile metal/s. The process may be used to recover metals from ores, ore concentrates or tailings, or from other metal containing materials including jewelry, electronic scrap and other scrap materials. The process may be particularly used in the context of leaching low grade ores, ore concentrates or tailings in in-situ, heap or tank leach approaches. It may also be used for leaching process intermediates and/or secondary or waste materials. Waste materials may include any solid material that is derived by human activity, fabrication or processing such as, but not limited to, municipal wastes, electronic and electrical scrap, mineral tailings, flue dusts, leach residues, slags, electrowinning and electrorefining slimes and sludges, any other metal bearing slimes and sludges and dross. The metal bearing material may also include contaminated soils.

As used herein, the term "precious metal" means gold (Au), silver (Ag) and the platinum group metals: ruthenium (Ru), rhodium (Rh), palladium (Pd), osmium (Os), iridium (Ir), and platinum (Pt). However, of these precious metals, the process is particularly applicable to the recovery of gold and/or silver, and discussion will therefore focus on these two precious metals.

As used herein, the term "chalcophile metal" means copper (Cu), nickel (Ni), cobalt (Co), zinc (Zn), lead (Pb), cadmium (Cd), thallium (Tl), indium (In), mercury (Hg), gallium (Ga), tin (Sn) and bismuth (Bi).

BACKGROUND ART

Many ores are associated with conditions that have acidic conditions in their direct environment or are preceded by acidic pre-oxidation processes. Such ores include precious metal and/or chalcophile metal ores. For instance, many gold mines have water contaminated with acidic mine drainage also bearing high level of iron. In addition, many refractory gold operations utilize acidic Pressure Oxidation (PDX) or acidic biological oxidation processes (BIOX) that oxidise the iron and sulfur associated with various iron sulfide minerals (which host precious metals such as gold, silver and platinum group metals (PGMs)). This implies that acidic and iron (ferric) bearing solutions are naturally available in lieu of the mining and processing environment.

In these systems, it is often not feasible to operate alkaline processes due to the neutralization requirements on top of significant gypsum production which is problematic during leaching and can block access of solids to the leach reagents. Conventional alkaline environments may use cyanide, ammonia or, more recently, glycine as possible lixiviants. However, in acidic environments, these lixiviants are often not suitable, or not effective on their own.

In contrast to the above mentioned alkaline processes, acidic leach processes have been more commonly employed. However, these acidic processes have attendant problems. A number of lixiviants are used in acidic environments (such as thiocyanate in the presence of an oxidant, chlorine-chloride systems, hypochlorite, bromine-bromide systems, acid-thiourea). For example, acidic thiourea is one alternative leach system to alkaline cyanide for gold extraction from some gold deposits. However, its use is problematic and it has therefore not been widely accepted due to the large amount of thiourea required for real ore systems and the commensurate costs.

Thiourea consumption is low in the presence of ferric ions for clear solutions (ferric acts as an oxidant). However, in actual leaching systems, the reaction between thiourea and ferric ions is significantly enhanced in the presence of most sulfide minerals, causing inordinately high thiourea consumption. One of the main drawbacks of existing thiourea leaching processes is therefore the extremely high thiourea consumption. Another drawback is the passivation of ore surface by thiourea decomposition by-products such as elemental sulfur. The high consumption of thiourea makes the process uneconomic for most industrial applications, particularly when base metals and their minerals are present.

The above references to the background art do not constitute an admission that the art forms a part of the common general knowledge of a person of ordinary skill in the art. The above references are also not intended to limit the application of the apparatus and method as disclosed herein.

SUMMARY OF THE DISCLOSURE

The present inventors have surprisingly discovered that use of one or more amino acids (or their derivatives, such as salts), synergistically with thiourea (or it derivatives), leads to the formation of an amino acid-thiourea compound (herein also referred to as "AAT"). When in an aqueous state, the amino acid-thiourea compound significantly enhances the rate and extent of metal dissolution in acidic solutions. More specifically, the aqueous amino-acid-thiourea compounds can give significantly higher precious and/or chalcophile metal recoveries on a mol-per-mol comparison to thiourea on its own.

The aqueous amino acid-thiourea compound may be formed by dissolving a preformed amino acid-thiourea compound (eg crystals) in the acidic solution. Alternatively, the aqueous amino acid-thiourea compound may be formed in situ in solution by mixing the reagents (e.g. amino acid and thiourea) in the solution such that the aqueous compound forms in situ by aqueous association. As used herein, the term "aqueous amino acid-thiourea compound" (or "aqueous AAT") is intended to cover both modes of formation.

The use of an amino-acid-thiourea compound (irrespective of the way it was prepared) thus enables significantly higher leach recoveries compared to when thiourea is used at the same molar concentration as the amino acid thiourea compound (or dissolved form). These thiourea-amino acid compounds are crystallographically different from either the amino acid or the thiourea from which they are derived, implying the formation of a new substance. For example, in the case of the amino acid glycine and thiourea, a new chemical compound, herein called glycine-thiourea, is formed which is crystallographically different and with different chemical and physical properties (e.g. melting point) from its source materials, being glycine and thiourea. Without wishing to be limited to specific physical properties, it has been observed that glycine-thiourea has a melting point of 156.3° C. with a unit cell volume of 370 Å$^3$, which is different to the values for α-glycine (226.8° C.; 315.01 Å$^3$), γ-glycine (178.9° C.; 231.46 Å$^3$) and thiourea (176.0° C., 360.73 Å$^3$).

The acid solutions may be naturally acidic (possibly with some ferric iron present), such as water derived from acid mine drainage. Alternatively, these solutions may form in situ, such as where the ore being leached contains minerals which, upon oxidation, lead to water acidification and the release of iron (ferric/ferrous) ions in solution.

In a first aspect there is disclosed a process for recovery of one or more elements, selected from precious metals and chalcophile metals as herein defined, from materials containing precious and/or chalcophile metal/s, said process including:
(i) contacting the material with an acidic solution containing a lixiviant comprising an aqueous amino acid-thiourea compound formed from an amino acid (as herein defined) and thiourea (as herein defined), optionally in the presence of an oxidant, in order to form a leachate containing the precious metal and/or chalcophile metal; and
(ii) recovering the precious metal and/or chalcophile metal from the leachate.

As used herein, the term "amino acid" means an organic compound containing both a carboxyl (—COOH) and an amino (—NH$_2$) functional group. For ease of discussion, the term "amino acid" is intended to include derivatives of amino acids. The derivatives may include amino acid salts, such as alkali metal salts, for example, a sodium or potassium glycinate, or alkaline earth salts, for example a calcium salt, or ammonium salts. The derivative may alternatively or in addition comprise a peptide.

In many cases, the amino acid contains a —CHR or CH$_2$ group. In most cases the amino (—NH$_2$) group and the carboxyl (—COOH) group connects to the same —CHR or —CH$_2$ connecting group and are referred to primary α-amino-acids. The "R" group in the —CHR connecting group can take on any organic structure, such as aliphatic hydrocarbon groups to complex organic structures including aromatic groups, heterocyclic groups, and poly-nuclear groups or various other organic groups. In its simplest form, the R-group is only hydrogen, in which case the molecule reverts to the simplest primary α-amino-acid, called glycine. The amino acid may comprise one or more of Glycine, Histidine, Valine, Alanine, Phenylalanine, Cysteine, Aspartic Acid, Glutamic Acid, Lysine, Methionine, Serine, Threonine, and Tyrosine.

As used herein, the term "thiourea" means the organic molecule (NH$_2$)$_2$CS. For ease of discussion, the term "thiourea" is intended to include derivatives thereof, such as isothiourea, salt mixtures of thiourea and inorganic salts, and isothiouronium salts where the isothiouronium functional group has the formula [RSC(NH$_2$)$_2$]$^+$ (R=alkyl, aryl) and is the acid salt of isothiourea. The H centres can also be replaced by alkyl and aryl functional groups. Salts comprising these anions are typically prepared by alkylation of thiourea: SC(NH$_2$)$_2$+RX→[RSC(NH$_2$)$_2$]$^+$X$^-$, where X$^-$ is typically, but not limited to, a halide, sulfate, nitrate, phosphate.

Without wishing to be limited by theory, it is believed that the amino acid and the thiourea form an organic component or complex in solution comprising an aqueous species derived from amino acid-thiourea compound (AAT) formed from a mixture of amino acid and thiourea. The AAT aqueous species serves as the lixiviant in the subject process. The AAT aqueous species may be formed in situ in solution during the leach process where the leach residence time is sufficient for the species to form. Alternatively the AAT may be pre-prepared as a compound then added to the leaching solution where it dissolves to form the AAT aqueous species. Amino acid and thiourea mixtures have been confirmed to be crystallizeable compounds by X-Ray diffraction of single crystals of the compound. An example is glycine-thiourea (GT), which can be prepared in-situ in solution as an aqueous complex, or separately as a compound with a well-defined unique crystal structure. For example, the glycine-thiourea component can be produced by dissolving high grade glycine in high grade thiourea solution at 1:1 molar ratio of Glycine:Thiourea at acidic pH (0.5 to 7). Other molar ratios (of the amino acid to thiourea) may also be considered, with preferably amino acid in excess.

The leaching process may be conducted in the presence of an oxidant. Examples of oxidants which may be used include air (gaseous and dissolved states), oxygen (gaseous and dissolved states), hydrogen peroxide, ferric ions, cupric ions, chromic ions, stannic ions, cobaltic ions, manganese dioxide, hypochloride, hypobromide, chlorite, chlorate, perchlorate, chlorine, bromine, bromate, perbromate, nitrate, permanganate, chromate or dichromate. Ferric ions are convenient oxidants in view of their availability in many process solutions and their low cost. The acidic solution may also contain an oxidant where the precious metal and/or chalcophile metal is present in a form/compound/mineral that requires oxidation to obtain the metal in its oxidised state. Conversely, where the metal is present in an oxidised form, such as a carbonate, oxide, sulfate or hydroxide, an oxidant may not be required.

If the system includes ferric ions, additional reagents may be added to increase the stability of ferric ions at leaching pH above 2.5, particularly from 3 to 7. These reagents can be gluconic acids, EDTA, Oxalate or any ferric chelating reagents such as various hydroxycarboxylic acids, such as citric acid, fumaric acid, tartaric acid and other acids of the hydroxycarboxylic group and organic carboxylic acids with at least one —OH group). Further to the ferric stabilising reagents mentioned above, excess amino acids, (in addition to that needed to form the Amino acid-Thiourea complex) may be used to stabilise ferric ions in acidic solutions as well at pH's above 2.5. The use of a ferric stabilising agent that comprises excess amino acid limits the addition of new reagents and therefore simplifies the chemistry of the system.

The leaching solution is acidic. If required, a pH modifier may be added to solution to reduce pH. A pH modifier can be any acid (organic or inorganic) that would adjust a solution pH to less than 7, for example sulfuric acid. Acid formation can also result from the in situ oxidation of sulfide minerals in the presence of oxygen (or other oxidant) and water, or by waters that are naturally acidic, as well as waters derived from acid mine drainage or acid rock drainage.

The material containing the precious metal and/or chalcophile metal may comprise an ore or an ore concentrate (herein collectively referred to as "ore" for easy discussion). The material may alternatively comprise a waste material, including mining waste such as tailings, industrial waste such as fly ash, or electronic waste ("e-waste"), such as computers, keyboards, televisions, mobile phones, etc. The material may be electrical and municipal waste. The material may be dross, slags, flue dusts and mattes derived from pyrometallurgical processing operations. The material may instead be a mining or metallurgical process intermediate such as precipitates, residues, or metal-bearing sludges or slimes (e.g. derived from electrowinning and electro-refining) The material may be metal-contaminated soils. While the following discussion will focus on the use of the recovery process for treating ores, it is to be understood that it is not limited thereto and is applicable to all solid precious metal and/or chalcophile metal-containing materials.

The precious metal and/or chalcophile metal-containing materials most often occur as sulfide minerals in ores, although oxides, arsenides, sulfo-arsenides, native metals, tellurides, sulfates, carbonates, chlorides, silicates, hydroxylated-salts and hydroxide minerals may also occur commonly.

Accordingly, there is disclosed a process which uses a new complex/component comprising an amino acid and thiourea in leaching precious metals (Au, Ag, Pt, Pd, Rh, Ir) and/or chalcophile metals (Cu, Ni, Co, Zn, Pb, Cd, Tl, In, Hg, Ga, Sn and Bi). The process is particularly useful for leaching precious metals, for which it is more economical given the relative cost differential between precious metals and the reagents used in the process.

The process can require very low thiourea consumption due to its complexing with glycine. The complexing of ferric ions (or alternative oxidant such as cupric) with chelating agents (eg, Gluconic acid, EDTA, Oxalate) also reduces the thiourea consumption significantly. The complexing agents used to complex with ferric ions in the present process can be one of oxalic acid, lactic acid, citric acid, tartaric acid, succinic acid, gluconic acid, and salts thereof; amines, for example, ethylenediamine, N,N-di(2-hydroxyethyl)glycine, as well as excess amino acids.

Examples of two chelating agents comprising amino acid and thiourea complexes are: Glutamic Acid+Thiourea and Glycine+Thiourea.

In an embodiment, the amino acid may be glycine (Gly) (chemically defined by the formula $NH_2CH_2CO_2H$). Glycine is a simple amino acid that is easy and cheap to produce on an industrial scale with the highest probability of industrial use. The following discussion will focus on the use of glycine and its salts as the amino acid, however, it is to be understood that the invention extends to other amino acids. "Glycine" may refer to the amino acid commonly known by this name, or any of its salts (such as sodium or potassium glycinate). Other common names for glycine include aminoacetic acid or aminoethanoic acid. In an embodiment, the amino acid is provided in an aqueous solution of an alkali, or alkaline earth, metal hydroxide (such as sodium or potassium hydroxide or calcium hydroxide).

Glycine and/or its salts are the preferred amino acid because of their:

large scale production and bulk availability;
low cost of production;
ease of transport;
chemical and thermal stability;
high solubility in water;
low price; and
low molecular weight.

While other amino acids may be used instead of (or in addition to) glycine, they are typically more costly and any performance benefit often cannot be justified by the additional costs that are incurred. Glycine has a very high solubility in water, is thermally stable, and stable in the presence of mild oxidants such as dilute hydrogen peroxide, manganese dioxide and oxygen. It is non-toxic and an environmentally safe and stable reagent. The ability to easily regenerate, recover and reuse glycine in acidic solutions are some of its most important attributes from an economic perspective.

The acidic solution should preferably be substantially free of intentional additions of detrimental species such as thiocyanate, chlorine, bromine, hydrofluoric acid containing species, for the reasons set out under "Background Art" above. In most cases, this will mean that the acidic solution is substantially free of those detrimental species. However, there may be cases where those detrimental species arise in situ in solution due to unintended reactions in solution.

In an embodiment, the leaching may take place "in situ" or "in place" (i.e., in the underground rock mass through use of a well-field). In another embodiment, the leaching may comprise dump leaching, such as by leaching blasted but uncrushed particles typically smaller than 200 mm. In another embodiment, the leaching may comprise heap leaching, such as by leaching coarse crushed particles typically smaller than 25 mm. In another embodiment, the leaching may comprise vat leaching, such as by leaching fine crushed, particles typically smaller than 4 mm. In another embodiment, the leaching may comprise agitated tank leaching, such as by leaching milled material having particles typically smaller than about 0.1 mm/100 micrometre. In another embodiment, the leaching may take place in pressure leaching autoclaves and may comprise leaching particles that are typically smaller than 100 micrometre.

The amino acid concentration in solution may vary from 0.01 to 250 grams per litre. In some embodiments, the concentration may be as high as 50 g/L, although it is typically less than 20 g/L. In other embodiments, the maximum concentration may be 10 g/L, such as a maximum of 5 g/L. The minimum concentration may be 0.01 g/L, although it is typically at least 0.1 g/L. In some embodiments, the concentration of amino acid is at least 0.3 g/L.

The thiourea concentration in solution may vary from 0.01 to 250 grams per litre. In some embodiments, the concentration may be as high as 50 g/L, although it is typically less than 20 g/L. In other embodiments, the maximum concentration may be 10 g/L, such as a maximum of 5 g/L. The minimum concentration may be 0.01 g/L, although it is typically at least 0.1 g/L. In some embodiments, the concentration of thiourea is at least 0.3 g/L.

The recovery process may be conducted over a range of temperatures where water remains in the liquid state at a given system pressure. In an embodiment, the process is conducted at ambient or mildly elevated temperatures. The process may be conducted from −10° C. to 200° C., such as from 0° C. to 100° C. Where the temperature is elevated, the temperature may be a minimum of 30° C., such as at least 40° C. The maximum temperature may be the boiling point of the solution. In an embodiment the process may be conducted at a temperature up to 75° C. In one embodiment, the process is conducted at a temperature between 20° C. to 65° C.

The recovery process may conveniently be conducted at atmospheric pressure (from mean sea level to low atmospheric pressures at altitudes of around 6000 meters above mean sea level). However in some embodiments, the process may be conducted at elevated pressure or at a pressure below atmospheric. The pressure may range from 0.01 bar to 1000 bar. However, it is typically between 0.5 and 1.5 bar.

The leaching step (i) may occur in the presence of variable amounts of dissolved oxygen which may, for example, be provided via aeration or oxygenation. Dissolved oxygen (DO) concentrations may vary from 0.1-100 milligrams per litre in solution, such as from 2 to 30 mg/L, depending on the oxygen demand (OD) of the CPMs in solution and the pressure of the leaching process.

Alternatively, or in addition, the oxidant may comprise a peroxide, such as hydrogen peroxide. The concentration of peroxide may be greater than 0.01%, such as at least 0.5%. In an embodiment, the peroxide concentration may be less than 5%, such as less than 3%. In another embodiment, mixtures of oxidants, e.g. air and hydrogen peroxide, may be used.

The leaching step (i) is conducted under acidic conditions. In an embodiment, the process is conducted using a moderately acidic solution having a pH range of between 0 and 6. In another embodiment, the pH range is between 1 and 6. In another embodiment, the pH is between 2 and 6. In another embodiment, the pH is between 1 and 3.

The process can be used with various water types, i.e. tap water, river water, sea water, as well as saline and hypersaline brines with significant dissolved salts containing sodium, magnesium, calcium, chloride, sulfate and carbonate ions in solutions.

The precious metal and/or chalcophile metal-containing materials and the acidic lixiviant react to leach the metal into the leachate. Without wishing to be limited by theory, it is believed that leaching forms a metal amino acid-thiourea complex.

The ratio of solid precious metal and/or chalcophile metal-containing materials to the acidic lixiviant can vary. For example, in the case of in-situ leaching, the solid to liquid ratio is likely to be high, such as up to 100:1. In agitated tank leaching the solid to liquid ratio is likely to be much lower, such as around 50:50, or 1:1, on a weight basis (i.e. 50 kg of solid to 50 kg of aqueous solution). In the case of leaching mineral concentrates, the ratio may be even lower, such as around 10 kg of solids per 90 kg of aqueous solution (i.e., 1:9). Other than there being some metal/mineral-bearing solid present, there is no minimum amount of solid relative to the (lixiviant-bearing) liquid phase.

Accordingly, the leach system used in the disclosed process comprises as a minimum of the following components:

A solid material containing the precious metals and/or chalcophile metals of interest.
An ionising solvent such as water.
A acidifier (pH modifier) such as a strong inorganic acid (such as sulfuric acid);
A lixiviant, comprising an amino acid-thiourea compound which is either pre-prepared prior to addition to the solution or is formed in-situ in solution.

In addition to the minimum specified leach system, oxidants (in gaseous, dissolved or solid state) may be added to the system. Ferric iron, oxygen, air and hydrogen peroxide are preferred oxidants/oxidising agents.

Where the oxidant is a metal cation, it may be present at a concentration of up to 10 g/L, such as less than 5 g/L. The minimum concentration may be 0.01 g/L, such as at least 0.1 g/L.

Where the oxidant is a metal cation, it is often appropriate to add a stabilising complexing agent to maintain the metal cation in solution to prevent hydrolysis and possible precipitation. For example, in the case of the ferric iron cation, excess amino acid, hydroxyl-carboxylic acids (e.g. gluconic acid, citric acid and tartaric acid), di- and polycarboxylic acids (e.g. oxalic acid) and EDTA are all suitable methods to stabilise ferric ions in an acidic solution (pH<7). Excess amino acids may also fulfil the role of ferric stabilising complexes in the acidic pH range.

If required, the stabilising complexing agent may be present in a concentration dependent on the concentration of the metal ion oxidant. The concentration may be less than 10 g/L, such as less than 5 g/L, and may be less than 2 g/L. The minimum concentration may be 0.01 g/L, such as at least 0.1 g/L.

Once leached, the metals may be recovered from aqueous solution using one of a range of extraction steps. The metals are typically present in the leachate as amino acid-thiourea complexes. The recovery step may also include regeneration of the amino acid-thiourea lixiviant. The regenerated lixiviant can then be recycled and reused, if desired, after any required pH correction.

Possible recovery steps may comprise chemical recovery such as by recovering the metal in a solid state (such as electrowon metal, hydrogen precipitated metal powders, or as a metal sulfide precipitate). The precious metals may also be recovered by zinc cementation (e.g. such as the Merrill Crowe process used commonly in precious metals recovery from solution). An alternative recovery step may comprise use of ion-exchange (IX) resins, solvent extraction (SX) organic solvents, activated carbon, molecular recognition (MR) resins, or coated adsorbents (CA's), which may include polyethylene immine (PEI) coated diatomaceous earth, ferrofluids, and CPM-selective organic adsorbents grafted onto solid matrices.

BRIEF DESCRIPTION OF THE DRAWINGS

Notwithstanding any other forms which may fall within the scope of the apparatus and method as set forth in the Summary, specific embodiments will now be described, by way of example only, with reference to the accompanying drawings in which.

DETAILED DESCRIPTION OF SPECIFIC EMBODIMENTS

Examples

Non-limiting Examples of a process for the recovery of one or more elements, selected from precious metals and chalcophile metals, are described below. The following abbreviations are used for lixiviants: "GT" is used for the system Glycine-Thiourea, "Tu" is used for Thiourea on its own, "Gly" refers to Glycine, "AA" refers any Amino acid and "AAT" refers to any amino acid-thiourea combination. GT or AAT may either be prepared beforehand as a distinct compound or in-situ as a GT/AAT complex in solution from its components. The pressure and temperature of all examples were 1 atmosphere and room temperature (20 deg C.), respectively.

Example 1

Figure 1A:
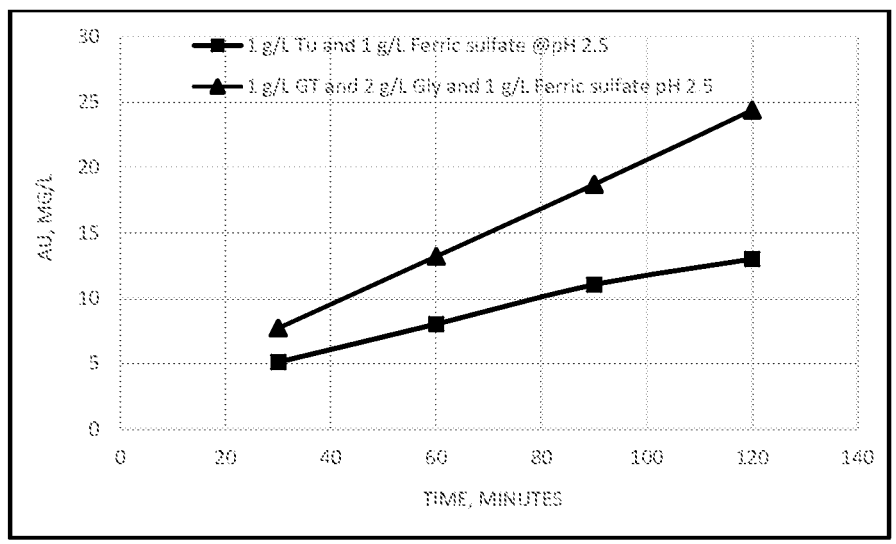
FIG. 1a is a graph showing gold extraction (mg/L) versus time (minutes) in solutions containing as lixiviants Thiourea only (squares) and Glycine-Thiourea (circles). Both solutions use ferric ions as oxidants.
Figure 1B:
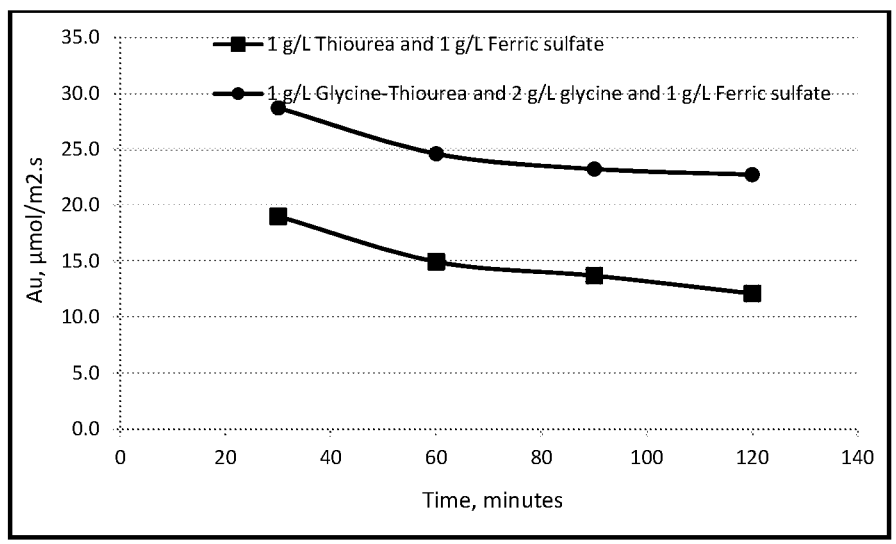
FIG. 1b is a graph showing gold extraction rates µmol/$m^2$.s versus time (minutes) in solutions containing as lixiviants Thiourea only (squares) and Glycine-Thiourea (circles). Both solutions use ferric ions as oxidants.

In a solution containing 1 g/L of glycine-thiourea (GT), 2 g/L glycine (Gly) and 1 g/L ferric sulfate at pH 2.5, gold ore was leached more rapidly than in the traditional leaching system (1 g/L Thiourea (Tu) and 1 g/L Ferric sulfate). It can be seen that gold leaching kinetics (FIG. 1a) and gold leaching rate (FIG. 1b) are much higher in the GT system than in the conventional thiourea leaching process. The new system presents two advantages, namely that glycine can carry/complex with both thiourea and the ferric ions.

Example 2

Figure 2A:
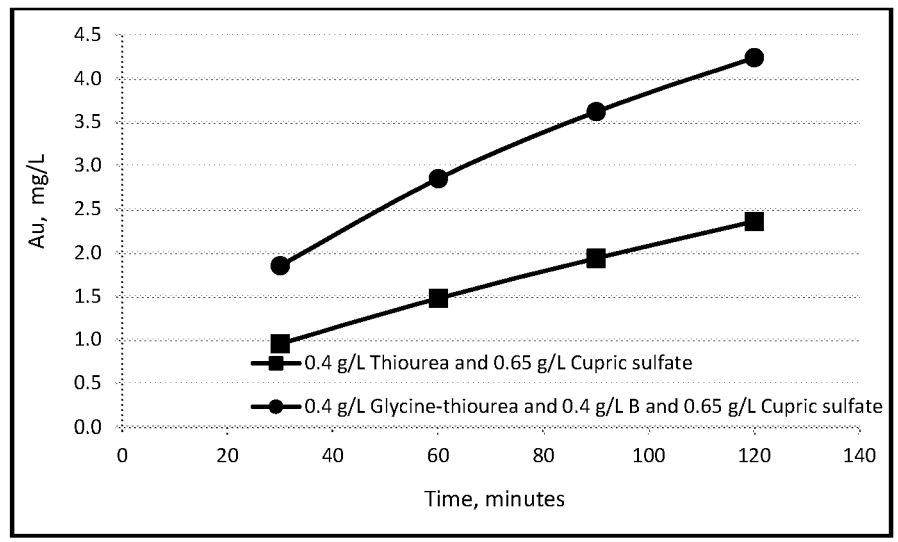
FIG. 2a a graph showing gold extraction (mg/L) versus time (minutes) in solutions containing as lixiviants Thiourea only (squares) and Glycine-Thiourea (circles). Both solutions use cupric ions as an oxidant.
Figure 2B:
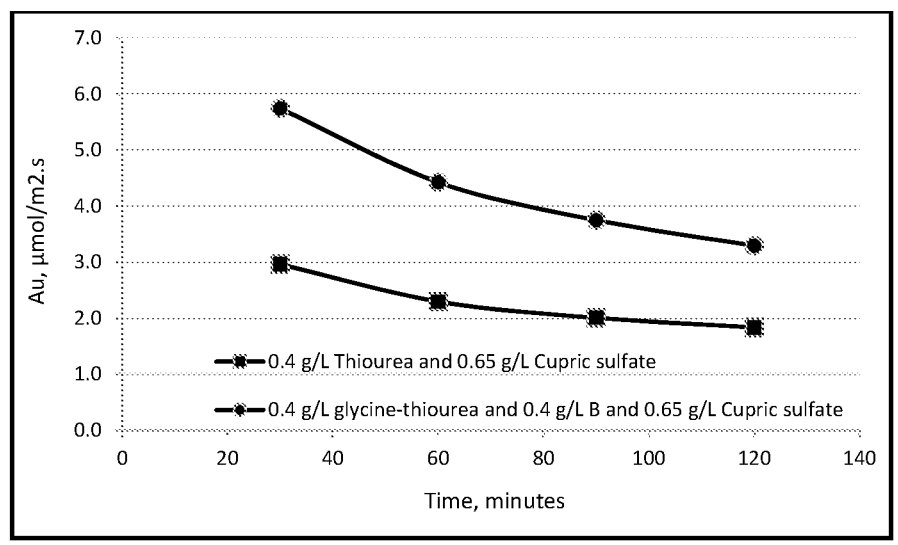
FIG. 2b is a graph showing gold extraction rates µmol/$m^2$.s versus time (minutes) in solutions containing as lixiviants Thiourea only (squares) and Glycine-Thiourea (circles). Both solutions use cupric ions as an oxidant.

In a solution containing 0.4 g/L of glycine-thiourea (GT), 0.4 g/L glycine, 0.65 g/L cupric sulfate at pH 3.0, gold ore was leached at close to twice the rate than the leaching system using thiourea only (0.4 g/L Tu and 0.65 g/L Cupric sulfate). It can be seen that gold leaching kinetics (FIG. 2a) and gold dissolution rate (FIG. 2b) is much higher when leaching with GT than leaching with Tu only. Note that "B" in FIGS. 2a and 2b refers to glycine and that cupric ions are used as an oxidant in both leaching systems.

Example 3

In Example 3, the residue arising from acidic pressure oxidization of a refractory gold ore (hereinafter called "acidic PDX residue") was subjected to leaching by thiourea and by glycine-thiourea solutions respectively. A slurry of acidic PDX residue was filtered, washed and dried. The acidic PDX filtrate contained ferric ions arising from the pressure oxidation process which were taken advantage of during the subsequent leaching steps.

Figure 3:
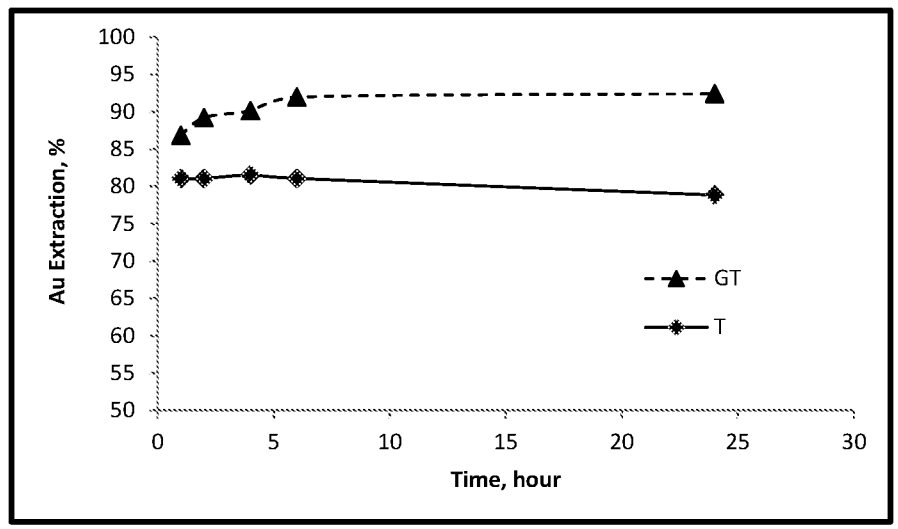
FIG. 3 is a graph showing gold extraction (%) versus time (hours) from gold PDX residue in solutions containing as lixiviants Thiourea only (diamonds) and Glycine-Thiourea (triangles)

FIG. 3 shows that gold extraction reached 92.4% when leaching an acidic PDX residue by glycine-thiourea (triangles) whereas only 78.8% gold extraction was achieved when the lixiviant was Thiourea only (diamonds). Thiourea addition was 2.5 kg/t and 5 kg/t to GT and Thiourea systems, respectively. The advantages of mixing glycine with thiourea was 50% Thiourea saving with about 13.6% greater gold extraction. Table 1 summarizes the amounts of thiourea addition for each leaching system and the amount of gold present in the acidic PDX residue before and after leaching by glycine-thiourea (GT) and Thiourea (T).

TABLE 1

Summary of GT and Thiourea leaching of POX residue sample

|  | UNITS | T | Crystalline GT |
|---|---|---|---|
| Head Grade | g/t | 4.51 | 4.51 |
| Calc Head G | g/t | 5.15 | 5.1 |
| Residue | g/t | 1.09 | 0.391 |
| Thiourea | kg/t | 5 | 2.5 |
| Glycine | kg/t | — | 2.5 |

Example 4

Figure 4:
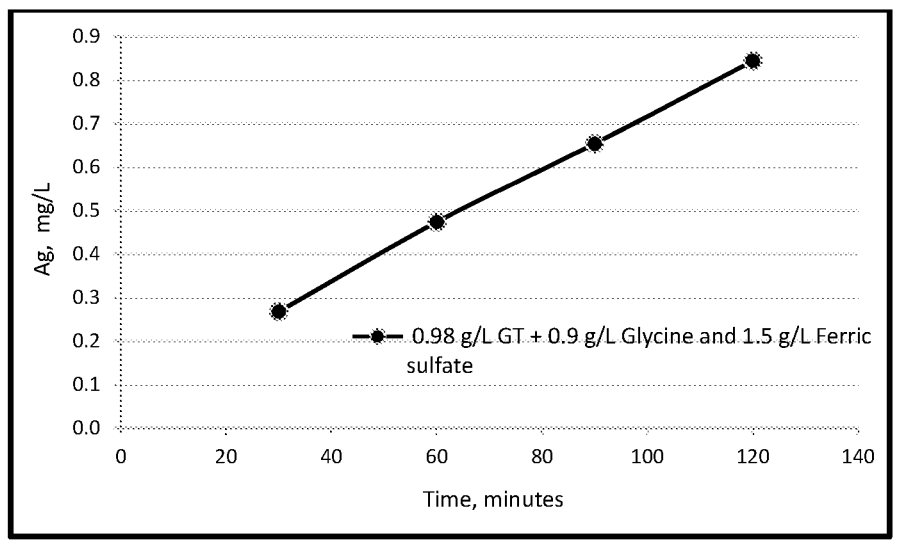
FIG. 4 is a graph showing silver extraction (mg/L) versus time (minutes) in Glycine-Thiourea and excess glycine in the presence of ferric ions as oxidant.

In solutions containing glycine-thiourea mixture and an excess of glycine in the presence of ferric as an oxidant, it was found silver can be easily leached from materials containing 4% silver. The pH and temperature of solution was 2 and ambient, respectively. The excess glycine acts as a stabilising complexing agent to maintain the ferric ions in solution. FIG. 4 shows silver extraction is continuously linear over the leaching time.

Example 5

Figure 5A:
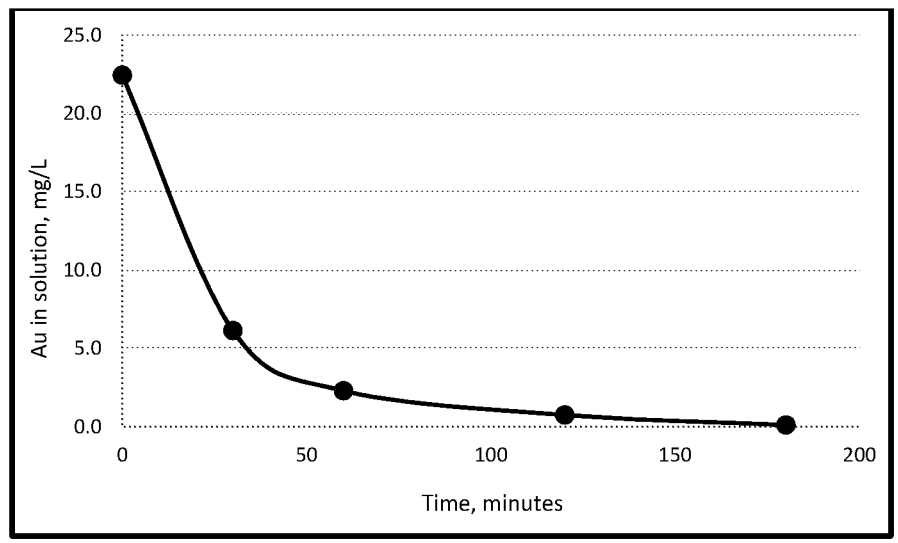
FIGS. 5a and 5b are graphs showing Gold recovery from acidic glycine-thiourea solutions by activated carbon (a) gold concentration (mg/L) versus time (minutes) and (b) log [Au]c/[Au]s vs log time.
Figure 5B:
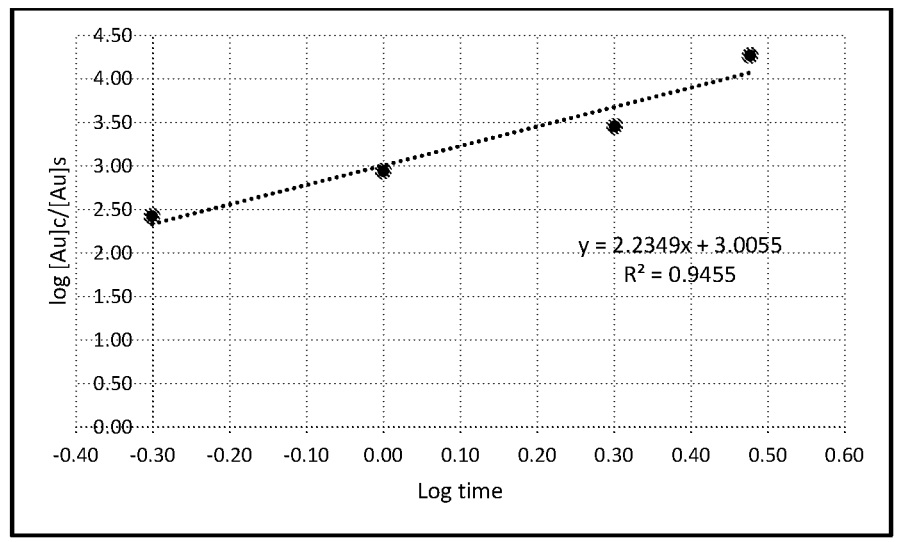

Gold recovery from leachate arising from glycine-thiourea leaching has been conducted using activated carbon. The results in FIG. 5a show that activated carbon can effectively adsorb gold from an acidic glycine-thiourea solution at 10 g/L carbon and a pH of 3. The model of gold adsorption from glycine-thiourea solutions shown in FIG. 5b indicates that 2.24 kg of gold/tonne of carbon was adsorbed in 4 hours.

Example 6

Figure 6:
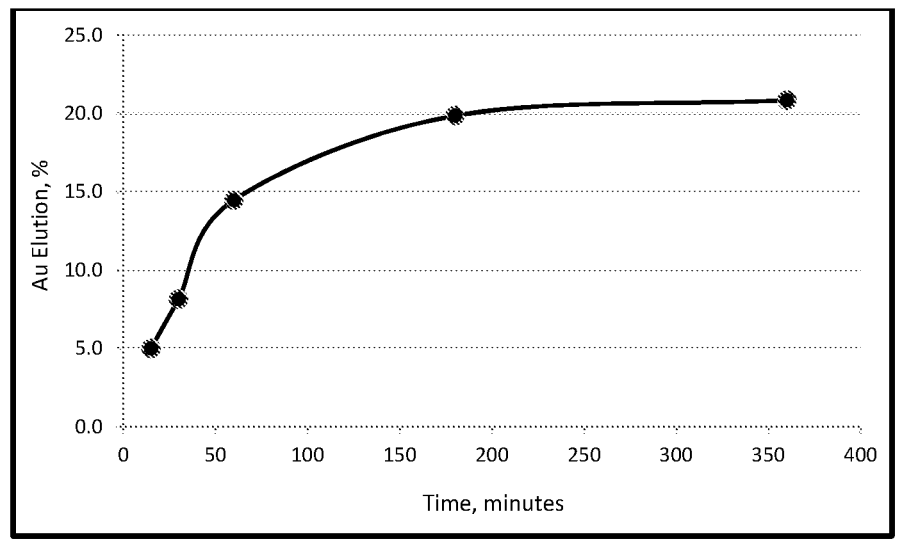
FIG. 6 is a graph of Gold Elution (%) versus time (minutes) from loaded activated carbon by acidic thiourea and sulphuric acid.
Figure 7:
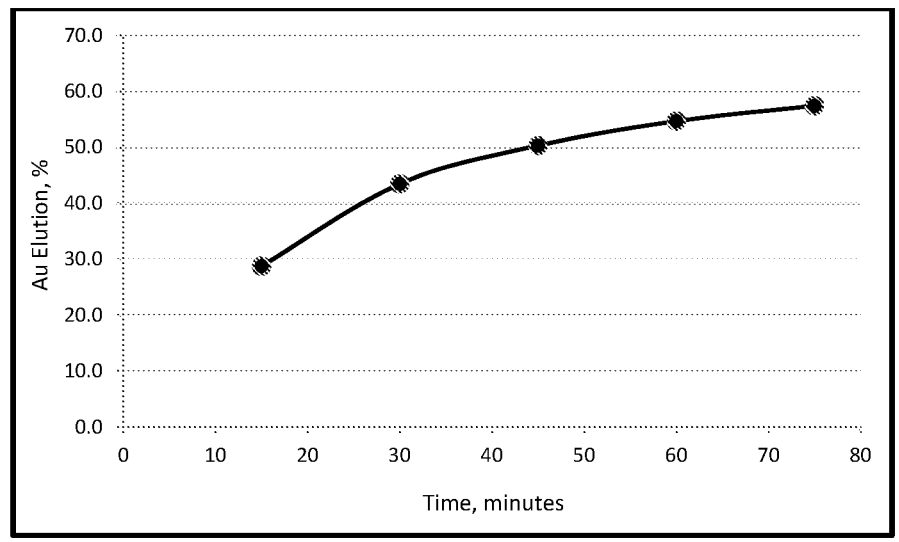
FIG. 7 is a graph of Gold Elution (%) versus time (minutes) from loaded activated carbon by sulfide and caustic solutions.

The loaded gold on carbon has been eluted by two different elution solutions and the results are shown in FIGS. 6 and 7. FIG. 6 shows the gold elution from loaded activated carbon by an elution solution comprising acidic thiourea and sulfuric acid (50 g/L Tu and 50 g/L sulfuric acid). FIG. 7 shows gold elution from loaded activated carbon by 0.5 M sulfide and 0.5 M NaOH. The Figures show positive results of elution efficiency from both systems. The use of a proper elution column under optimized elution conditions can achieve a better elution recovery.

Example 7

Thiourea (Tu) and glycine (Gly)-thiourea leaching of a BIOX gold bearing flotation concentrate has been conducted under different reagent concentrations. The bulk mineralogy of the material is provided below:

TABLE 2

Mineralogy of the BIOX gold bearing flotation concentrate

| Mineral (%) | BIOX (concentrate) |
|---|---|
| Quartz | 36 |
| Mica | 33 |
| Pyrophyllite | 0 |
| Amphibole | 14 |
| Jarosite | 5 |
| Other clays | 9 |
| Gold (g/t) | 140 |

The BIOX-concentrate is derived from an industrial BIOX pretreatment plant. Samples were bottle-rolled at 10% solids in 450 mL water at 140 rpm.

Figure 8:
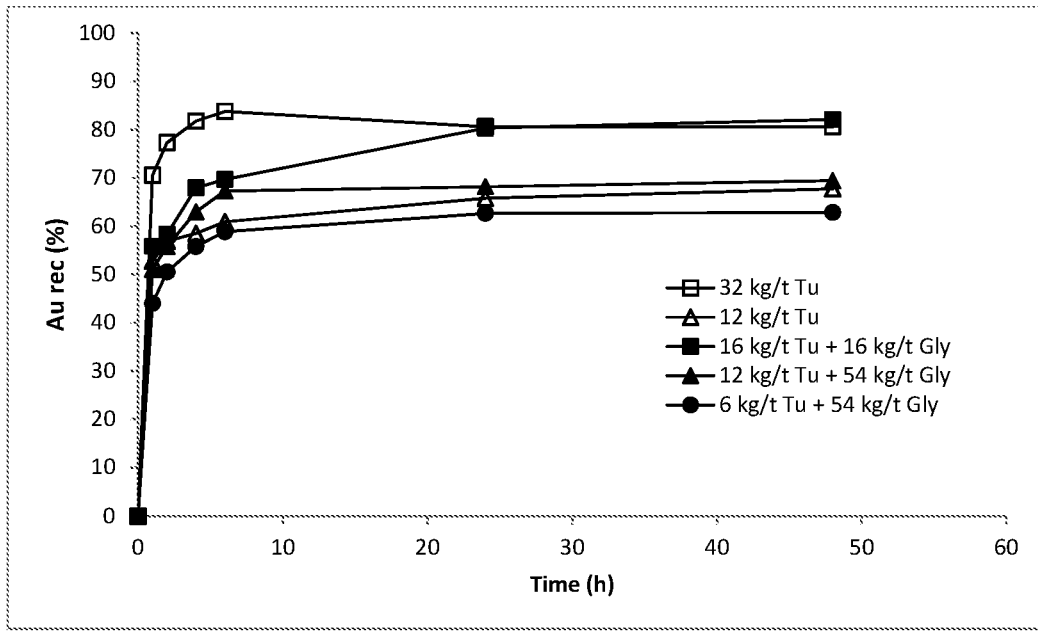
FIG. 8 is a graph of gold recovery (%) versus time (hours) for leaching of a BIOX gold bearing flotation concentrate under different reagent concentrations.

Very rapid gold dissolution was observed (FIG. 8) under all process conditions. The results show that leaching with a solution comprising 16 kg thiourea/tonne ore and 16 kg glycine/tonne ore gives the same total dissolution as using a solution containing 32 kg Thiourea/tonne ore. Accordingly, the quantity of thiourea, which is expensive, can be significantly reduced by instead using the amino acid-thiourea lixiviant of the present invention. Moreover, the lixiviant can be regenerated and recycled, thereby further reducing operational costs.

Example 8

Thiourea and glycine-thiourea leaching of a pressure oxidised gold bearing ore has been conducted under different reagent concentrations. The bulk mineralogy of the material is provided below:

TABLE 3

Mineralogy of the pressure oxidised gold bearing ore.

| Mineral (%) | POX (ore) |
| --- | --- |
| Quartz | 59 |
| Mica | 0 |
| Pyrophyllite | 29 |
| Amphibole | 0 |
| Jarosite | 0 |
| Other clays | 11 |
| Gold (g/t) | 4.7 |

The samples were bottle-rolled at 40% solids in 600 mL water at 140 rpm. Reagents were added equally in stages at each data point.

Figure 9:
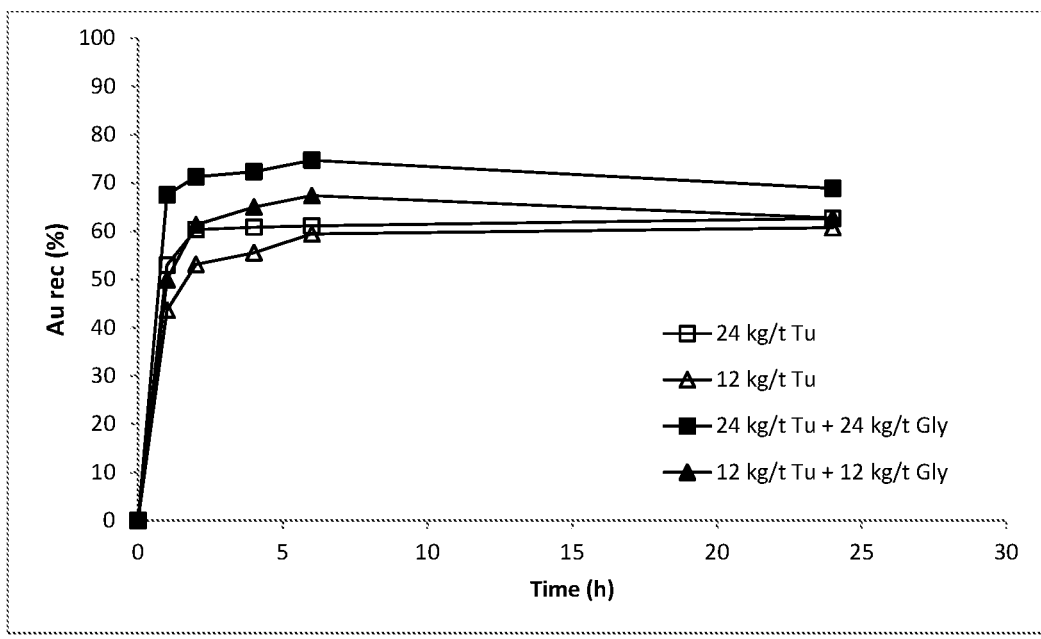
FIG. 9 is a graph of gold recovery (%) versus time (hours) for leaching of a pressure oxidised gold bearing ore under different reagent concentrations.

Rapid gold dissolution was observed (FIG. 9) under all process conditions. The results show that leaching with a solution comprising Glycine+Thiourea was always more effective than using a solution containing the same quantity of Thiourea without amino acid. In addition, leaching using a solution containing as a lixiviant 12 kg Thiourea/tonne ore+12 kg Glycine per tonne ore, gave better results than leaching with a solution containing double the quantity (24 kg Thiourea (only)/tonne ore) of thiourea on its own. Again, the reduced need for and the ability to regenerate and recycle expensive reagents enables significant reduction in operational costs.

Whilst a number of specific process embodiments have been described, it should be appreciated that the process may be embodied in many other forms.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and method as disclosed herein.

The invention claimed is:

1. A process for recovery of one or more elements, selected from precious metals and chalcophile metals as herein defined, from materials containing precious and/or chalcophile metal/s, said process including:
    (i) a leaching step comprising contacting the material with an acidic solution having a pH between 0 and 5 and containing a lixiviant comprising an aqueous amino acid-thiourea compound formed from an amino acid (as herein defined) and thiourea (as herein defined), in order to form a leachate containing the precious metal and/or chalcophile metal; and
    (ii) a recovery step comprising recovering the precious metal and/or chalcophile metal from the leachate.

2. The process of claim 1, wherein the amino acid concentration in solution is between 0.01 to 250 grams per litre and the thiourea concentration in solution is between 0.01 to 250 grams per litre.

3. The process of claim 1, wherein the amino acid-thiourea compound is formed in situ in solution.

4. The process of claim 1, wherein the leaching step is performed in the presence of an oxidant, selected from air (gaseous and dissolved states), oxygen (gaseous and dissolved states), hydrogen peroxide, ferric ions, cupric ions, chromic ions, stannic ions, cobaltic ions, manganese dioxide, hypochloride, hypobromide, chlorite, chlorate, perchlorate, chlorine, bromine, bromate, perbromate, nitrate, permanganate, chromate and dichromate.

5. The process of claim 4, wherein the oxidant is dissolved oxygen provided via aeration or oxygenation and is between 0.1 and 100 mg/L in solution.

6. The process of claim 4, wherein the oxidant is selected from:
    (a) hydrogen peroxide at a concentration from 0.01 wt. %, to 5 wt. %,
    (b) ferric ions, and
    (c) metal ions and the acidic solution comprises a stabilizing reagent to increase the stability of the metal ions.

7. The process of claim 6, wherein the stabilizing reagent is selected from hydroxyl-carboxylic acids (gluconic acid, citric acid and tartaric acid), di-and polycarboxylic acids (oxalic acid), EDTA and any ferric chelating reagents.

8. The process of claim 6, wherein the stabilizing reagent comprises excess amino acids.

9. The process of claim 4, wherein the oxidant is between 2 and 30 mg/L in solution.

10. The process of claim 1, wherein the acidic solution further comprises a pH modifier.

11. The process of claim 1, wherein the material containing the precious metal and/or chalcophile metal comprises one or more of:
    (a) an ore or an ore concentrate,
    (b) a waste material comprising electronic or electrical scrap or mining waste,
    (c) a mining or metallurgical process intermediate, or
    (d) metal-contaminated soils.

12. The process of claim 1, wherein the precious metal and/or chalcophile metal is in the form of one or more of sulfides, oxides, arsenides, sulfo-arsenides, native metals, tellurides, sulfates, carbonates, chlorides, silicates, hydroxylated-salts and hydroxide minerals.

13. The process of claim 1, wherein the leaching step takes place "in situ" or "in place".

14. The process of claim 1, wherein the leaching step is selected from:
    (i) dump leaching, which comprises leaching blasted but uncrushed particles, smaller than 200 mm,
    (ii) heap leaching, which comprises leaching coarse crushed particles, smaller than 25 mm,
    (iii) vat leaching, which comprises leaching fine crushed, particles, smaller than 4 mm,
    (iv) agitated tank leaching, which comprises leaching milled material having particles smaller than about 0.1 mm/100 micrometres, or (v) leaching takes place in a pressure leaching autoclave, and comprises leaching particles that are smaller than 100 micrometres.

15. The process of claim 1, wherein the recovery step is conducted at a temperature where water remains in the liquid state at a given system pressure, wherein the recovery step is conducted at an ambient temperature or an elevated temperature that is above ambient temperature.

16. The process of claim 1, wherein the recovery step is conducted from −10° C. to 200° C.

17. The process of claim 1, wherein the recovery step is conducted at atmospheric pressure, an elevated pressure or a pressure below atmospheric pressure.

18. The process of claim 1, wherein the recovery step is conducted at a pressure from 0.01 bar to 1000 bar.

19. The process of claim 1, wherein the recovery step comprises recovering the metal in a solid state by zinc cementation, or by using one of:
ion-exchange (IX) resins, solvent extraction (SX), organic solvents, activated carbon, molecular recognition (MR) resins, or coated adsorbents (CA's).

20. The process of claim 1, wherein the recovery step includes regeneration of the amino acid-thiourea lixiviant.

21. The process of claim 1, wherein the amino acid-thiourea compound is glycine-thiourea.

22. The process of claim 21, wherein the amino acid-thiourea compound is produced by dissolving glycine in thiourea solution at a minimum 1:1 molar ratio of Glycine:Thiourea.

23. The process of claim 1, wherein the acidic solution has a pH range of between 1 and 3.

24. The process of claim 1, wherein the recovery step is conducted from 0° C. to 100° C.

25. The process of claim 1, wherein the recovery step is conducted from 20° C. to 65° C.

26. The process of claim 1, wherein the recovery step is conducted at a pressure from 0.5 bar to 1.5 bar.

27. The process of claim 10, wherein the pH modifier is sulfuric acid.

* * * * *